May 14, 1968 S. N. KOBLICK 3,383,651
PLANE COORDINATE COMPUTING SYSTEM
Filed Jan. 31, 1967 3 Sheets-Sheet 1

INVENTOR.
Sol N. Koblick
BY

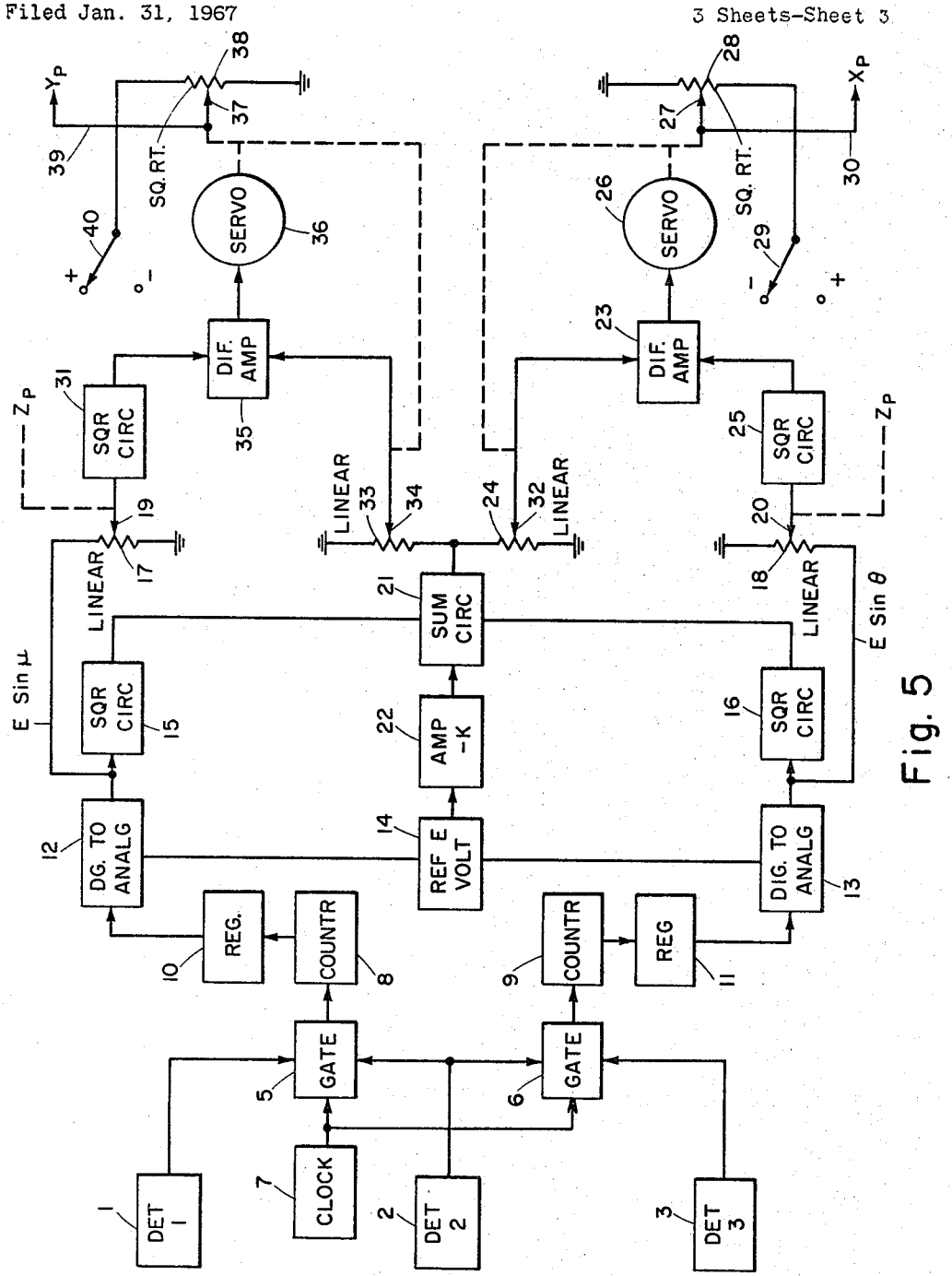

United States Patent Office 3,383,651
Patented May 14, 1968

3,383,651
PLANE COORDINATE COMPUTING SYSTEM
Sol N. Koblick, North White Plains, N.Y., assignor, by mesne assignments, to the United States of America as represented by the Secretary of the Navy
Filed Jan. 31, 1967, Ser. No. 613,052
3 Claims. (Cl. 340—6)

ABSTRACT OF THE DISCLOSURE

The plane cordinate computer system disclosed utilizes a bottom mounted acoustic pinger to mark a reference location, and this pinger periodically radiates pulses which are detected by an orthogonal hydrophone receiving array mounted on a vessel whose coordinate location, with respect to said reference location, is desired. The three hydrophones which make up the receiving array are located at the apices of a right isosceles triangle, and the output of these hydrophones is fed to a computing system, including servomechanism devices, which solves for the X and Y coordinates of the vessel with respect to the reference location.

---

The invention described herein may be manufactured and used by or for the Government of the United States of America for governmental purposes without the payment of any royalties thereon or therefor.

The present invention is directed to a navigation system employing electro-acoustic techniques for determining the plane coordinate location of a marine vessel with respect to a predetermined reference position.

In carrying out marine rescue work or in performing oceanographic research, it is oftentimes necessary to navigate the operational vessel repeatedly over a predetermined course related to a particular bottom site. One technique that has been employed is to mark this site with a transponder and periodically interrogate this device with sonar apparatus. While this arrangement does provide information as to the slant range of the vessel from the site in question, it does not provide coordinate data. This type of data is desirable since it can be readily utilized by graphic plotting apparatus and automatic control systems for maintaining the vessel on any desired track with respect to the marked site.

It is accordingly a primary object of the present invention to provide an arrangement for determining the plane coordinate location of a vessel with respect to a predetermined ocean position.

Another object of the present invention is to provide an electro-acoustic system which continuously gives coordinate data on the position of a surface or submerged vessel with respect to a predetermined ocean reference site.

Another object of the present invntion is to provide a navigation system for marine vessels which provides coordinate data on the vessel's location with respect to an underwater sound source that designates a particular ocean position.

Other objects, advantages and novel features of the invention will become apparent from the following detailed description of the invention when considered in conjunction with the accompanying drawings wherein:

FIG. 1 schematically illustrates the hydrophone array mounted in the marine vessel;

FIG. 5 illustrates the signal processing system associated with the hydrophone array which produces the coordinate output signals.

Briefly and in somewhat general terms, the present invention utilizes a bottom-mounted acoustic pinger to mark the reference site, and this pinger periodically radiates pulse signals which may be detected by an orthogonal hydrophone receiving array aboard the ship. The three hydrophones which make up this array are arranged preferably at the apices of a right isosceles triangle.

The determination of the plane coordinate position of the vessel is effected by the reception of time difference signals at two hydrophone pairs. That is, the time difference in arrival of an acoustic signal at the two hydrophones positioned along one of the equal sides of the triangle determines, for example, the ship's X coordinate; while the time difference of arrival of the same signal at the two hydrophones positioned along the other equal side of the triangle, determines the ship's Y coordinate.

Figure 1:
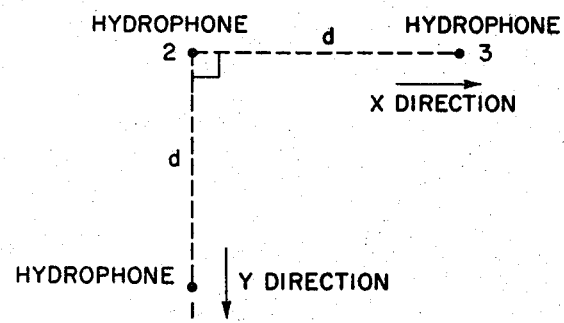

Referring now to FIG. 1 of the drawings, it will be seen that the orthogonal receiving array carried by the vessel consists of hydrophones 1, 2 and 3, with hydrophone 2 positioned at the vertex of a right-angle triangle and separated by a distance $d$ from the other two hydrophones. The array is orientated such that the hydrophones remain in the XY plane shown in FIG. 2.

Figure 2:
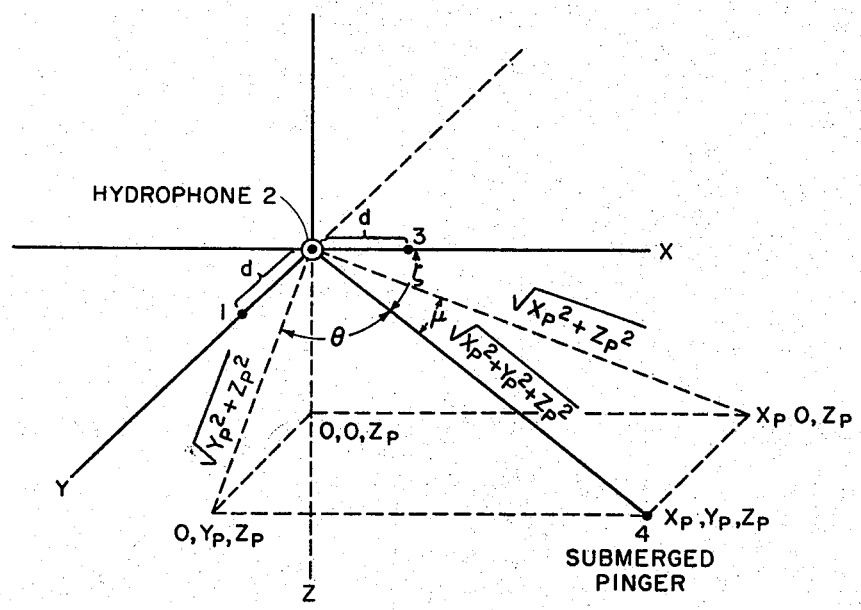
FIG. 2 illustrates the geometry of the over-all system.

FIG. 2 depicts the geometry of a coordinate system having its origin corresponding to the location of hydrophone 2 of the receiving array. The submerged pinger 4 marks the reference site, and this site has coordinates $X_p$, $Y_p$, $Z_p$, with $X_p$ being the distance along the X coordinate, $Y_p$ the distance along the Y coordinate, and $Z_p$ the vertical distance or depth of water over the submerged pinger. This depth, as will be seen, must be known and manually inserted into the signal processing system which develops the coordinate signals.

It can be shown that the plane coordinate location of hydrophone 2 with respect to the submerged pinger 4 is (1) $$X_p = \frac{Z_p \sin \theta}{\sqrt{\cos^2 \theta \cos^2 \mu - \sin^2 \theta \sin^2 \mu}}$$

and (2) $$Y_p = \frac{Z_p \sin \mu}{\sqrt{\cos^2 \theta \cos^2 \mu - \sin^2 \theta \sin^2 \mu}}$$

Figure 3:
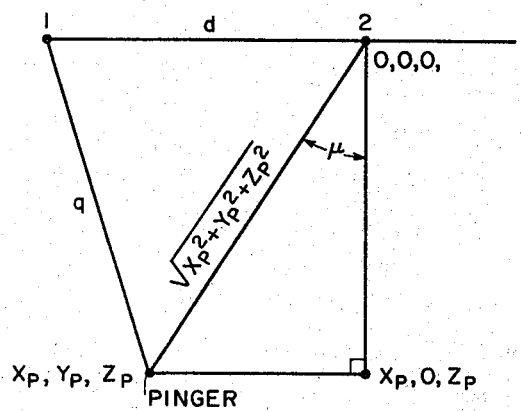
FIG. 3 shows a portion of the geometrical system including hydrophones 1 and 2.

From the shipboard hydrophone receiving pairs 1 and 2 and 2 and 3, the plane projection angles $\theta$ and $\mu$ can be determined. The angles $\theta$ and $\mu$ are the angles between the slant range vector and the respective projections of this vector in YZ and XZ planes. FIG. 3 illustrates the geometry for hydrophone pairs 1 and 2 and it can be shown that (3) $$q^2 = d^2 + X_p^2 + Y_p^2 + Z_p^2 - 2d\sqrt{X_p^2 + Y_p^2 + Z_p^2} \cos(90° - \mu)$$

or (4) $$q^2 = d^2 + X_p^2 + Y_p^2 + Z_p^2 - 2d\sqrt{X_p^2 + Y_p^2 + Z_p^2} \sin \mu$$

If the path difference between the reference site and hydrophones 1 and 2 is designated $\Delta y$, then this $\Delta y$ is equal to $\bar{c}\Delta t_y$ where $\bar{c}$ is the average of the velocity of sound in the fluid medium and $\Delta t_y$ the time difference between the reception of a signal from sound source 4 at these same two hydrophones.

This path difference may be written as (5) $$\Delta y = \sqrt{q^2} - \sqrt{X_p^2 + Y_p^2 + Z_p^2}$$

and it can be shown by a mathematical treatment that $\Delta y^2 = d^2 \sin^2 \mu$. Since $d$, the distance separating the hydrophones is small compared to the distances involved, the last equation can be written as $\Delta y = d \sin \mu = \overline{c}\Delta ty$ without appreciable error.

Figure 4:
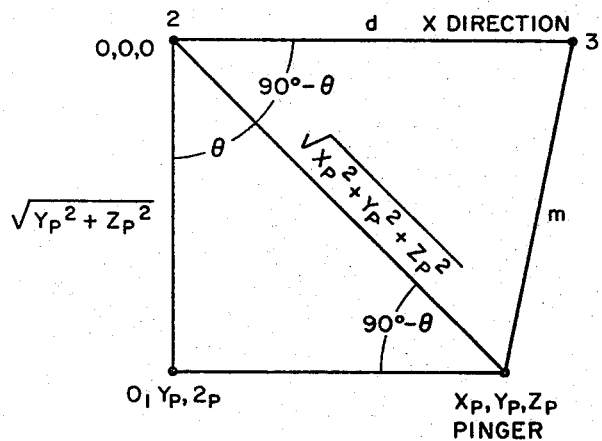
FIG. 4 shows a portion of the geometrical system including hydrophones 2 and 3.

To determine $\sin \theta$, the other angle involved in Equations 1 and 2, the geometry illustrated in FIG. 4 may be employed. It can be shown that (6) $m^2 = d^2 + X_p^2 + Y_p^2 + Z_p^2 - 2d\sqrt{X_p^2 + Y_p^2 + Z_p^2} \cos(90° - \mu)$ or (7) $m^2 = d^2 + X_p^2 + Y_p^2 + Z_p^2 - 2d\sqrt{X_p^2 + Y_p^2 + Z_p^2} \sin \theta$ The similarity between these equations and Equations 3 and 4 will be appreciated. Likewise, if the path difference for the $x$ direction is $\Delta x$, this quantity may be written as (8) $\Delta x = \sqrt{m^2} - \sqrt{X_p^2 + Y_p^2 + Z_p^2}$ The equations for $\Delta x$ and $m^2$ have the same form as those for $\Delta y$ and $q^2$, previously considered. Consequently, it can be shown that if $d$ is neglected, $\Delta x = d \sin \theta = \overline{c}\Delta tx$.

Using the identities that (9) $\cos^2 \theta + \sin^2 \theta = 1$

(10) $\cos^2 \mu + \sin^2 \mu = 1$

Equations 1 and 2 may be written as follows:

(11) $X_p = \dfrac{Z_p \sin \theta}{\sqrt{1 - \sin^2 \mu - \sin^2 \theta}}$

(12) $Y_p = \dfrac{Z_p \sin \mu}{\sqrt{1 - \sin^2 \mu - \sin^2 \theta}}$

These equations, it will be seen, are effectively solved in the signal processing circuit shown in FIG. 5.

Referring now to FIG. 5, it will be seen that the output signals from hydrophones 1, 2 and 3 are sent, after appropriate shaping and stretching, to a pair of gates 5 and 6 which selectively control the passage of pulses from clock generator 7 to a pair of counters 8 and 9. More particularly, if, for example, hydrophone 1 detects a pulse radiated from pinger 4 before hydrophone 2 does, then its output opens gate 5, permitting clock pulses to enter counter 8 until hydrophone 2 subsequently detects the same radiated pulse from pinger 4 and closes this gate. Thus, the count stored in counter 8 corresponds to the time difference ($\Delta ty$) in arrival of acoustic pulses in the $y$ direction since hydrophones 1 and 2 are aligned in this direction.

If hydrophone 3 detects a pulse radiated from pinger 4 before hydrophone 2 does, its output opens gate 6, permitting clock pulses to enter counter 9 until hydrophone 2 subsequently detects this same radiated pulse and closes this gate. Thus, the count stored in counter 9 corresponds to the time difference ($\Delta tx$) in arrival of acoustic pulses in the $x$ direction, since hydrophones 2 and 3 are aligned in this direction.

Thus, whichever hydrophone of the pairs, 1 and 2 and 2 and 3, first detects the acoustic pulse, that hydrophone opens its companion gate and maintains it open until the other hydrophone of the pair subsequently detects this same acoustic pulse and closes it. Consequently, it is possible for the output of hydrophone 2 to close one gate while opening the other to simultaneously close both gates, or to simultaneously open both gates.

Counters 8 and 9 are coupled to registers 10 and 11, and these circuits, in turn, supply input signals to a pair of digital-to-analog converters 12 and 13 which have as their other input a reference voltage E derived from a reference voltage source 14. The registers are included in the system in order to permit the counters and their control circuits to be reset during the period between pulses radiated from pinger 4, and this resetting may be done in any well-known manner by utilizing, for example, the terminal edges of the late arriving acoustic pulse.

The digital-to-analog converters 12 and 13, it will be appreciated, develop voltage wave forms whose amplitudes are proportional to the mathematical functions $\sin \mu$ and $\sin \theta$, respectively, since, as seen hereinbefore, these functions are directly proportional to the time intervals $\Delta tx$ and $\Delta ty$, previously identified, which time intervals also correspond to the period during which counters 8 and 9 were coupled to the clock source.

The outputs from the digital-to-analog converters are fed to a pair of squaring circuits 15 and 16 and also to a pair of linear potentiometers 17 and 18 whose movable taps 19 and 20 are set in accordance with the magnitude of $Z_p$, the depth of water at the location of pinger 4. Each of the squaring circuits has a gain conversion factor $k$. The output of squaring circuit 15 which is, therefore $Ek \sin^2 \mu$, and the output from squaring circuit 16, which is, therefore, $Ek \sin^2 \theta$, are fed to a summing amplifier 21 which has as its third input the signal $-kE$ derived from amplifier 22 of gain $-k$ coupled to reference voltage source 14. The output of summing amplifier 21 corresponds to the expression $Ek(1 - \sin^2 \theta - \sin^2 \mu)$.

Equations 11 and 12 may be rewritten as follows:

(13) $kEX_p^2[1 - \sin^2 \mu - \sin^2 \theta] = kZ_p^2 E \sin^2 \theta$

(14) $kEY_p^2[1 - \sin^2 \mu - \sin^2 \theta] = kZ_p^2 E \sin^2 \mu$

Equation 13 is solved for $X_p$ by the following arrangement. The quantity $EZ_p \sin \theta$ is formed by supplying the output from digital-to-analog converter 13, $E \sin \theta$, to linear potentiometer 18, movable tap 20 of which is set in accordance with the magnitude of $Z_p$, thus performing a so-called linear potentiometer multiplication. This quantity is then squared in squaring circuit 25 which has a gain conversion factor $k$, thereby producing $kZ_p^2 E \sin^2 \theta$. This last-mentioned signal serves as one of the inputs to a difference amplifier 23. The other input of this amplifier is derived from the movable tap 24 of a linear potentiometer 32, one side of which is grounded and the other side of which is connected to the output of summing amplifier 21. Linear potentiometer 32 serves as a multiplying device so that the output signal at its movable tap corresponds to $kEX_p^2[1 - \sin^2 \mu - \sin^2 \theta]$.

The position of movable tap 24 is under the control of a servomechanism 26 which is energized from difference amplifier 23. Servomechanism 26, it will be appreciated, positions tap 24 so as to equalize the two input signals at difference amplifier 23. When these input signals are equal, there is no voltage available for driving servomechanism 26 and, when this condition occurs, this portion of the over-all system has, in effect, solved for the $X_p^2$.

The shaft position assumed at the output of servomechanism 26, more specifically, is such as to satisfy the following relationship:

(15) $kEZ_p^2 \sin^2 \theta - kX_p^2 E[1 - \sin^2 \mu - \sin^2 \theta] \leq \epsilon$ In the steady-state condition $\epsilon$ approaches zero volts and therefore this equation may be written as

(16) $kEZ_p^2 \sin^2 \theta = kX_p^2 E[1 - \sin^2 \mu - \sin^2 \theta]$

Equation 16 is identical to Equation 13 and, thus, the apparatus just described solves for $X_p$ in terms of the shaft position of servo 26. Thus, this servo is used also to drive the movable tap 27 of a square root potentiometer 28 to develop $X_p$. One side of this potentiometer is grounded and the other side is selectively connected by means of switch 29 to a positive or negative voltage, depending upon which hydrophone, 2 or 3, of the X pair first detects the acoustic pulse from pinger 4.

The output voltage of potentiometer 28, as taken from its movable tap 27, is therefore proportional to $X_p$. The sign of $X_p$, as just mentioned, is determined by the specific hydrophone pair which measures the time difference of arrival for a single coordinate. Hydrophone pair 2 and 3 is utilized to determine the function $\sin \theta$ and its sign. If an acoustic signal is first received at hydrophone 3, the angle $\theta$ is positive and $X_p$ is positive. If the converse is true, the angle is negative and $X_p$ is negative. Utilization of this sign convention will produce a maximum error of $d/2$ in the coordinate location for $X_p$ where $d$, as noted hereinbefore, is the hydrophone spacing. This spacing usually will be in the order of fifty feet.

Switch 29 may be controlled by manual means or by an electromagnetic relay, not shown, whose control winding may be selectively energized in a first or second direction, depending upon which hydrophone of the pair first detects the acoustic pulse.

To determine $Y_p$, the same signal processing sequence employed in connection with the solution of $X_p$ is used. Thus, there are two parallel signal paths in the system of FIG. 5, with one path, the lower one, dealing with sin $\theta$ and the upper path, sin $\mu$.

The quantity $Z_p$ sin $\mu$ is formed by supplying the output from digital-to-analog converter 12, which is $E$ sin $\mu$, to a linear potentiometer 17 and setting the movable tap 19 of this potentiometer in accordance with the magnitude of $Z_p$. This quantity is then squared in squaring circuit 31 which has a gain conversion $k$. The quantity $kZ_p^2 E \sin^2 \mu$ is produced at the output of squaring circuit 31, and this signal is supplied as one of the inputs to difference amplifier 35. The other input to this amplifier is derived from the movable tap 34 of a linear potentiometer 33, one side of which is grounded and the other side of which is connected to the output of summing amplifier 21. Linear potentiometer 33 also serves as a multiplying device, and the output signal at its movable tap 34 corresponds to $kEY_p^2[1-\sin^2 \mu - \sin^2 \theta]$. The position of this tap is under the control of a second servomechanism 36 which is connected to difference amplifier 35. Servomechanism 36, like its counterpart 26, positions tap 34 so as to equalize the two input signals of difference amplifier 35. When these two input signals are equal, there is no driving voltage for servo 36, and this portion of the system has solved for $Y_p^2$.

The shaft position assumed at the output of servomechanism 36 is such as to satisfy the following relationship:

(17) $\quad kEZ_p^2 \sin^2 \theta - kY_p^2 E[1-\sin^2 \mu - \sin^2 \theta] \leq \epsilon$ In the steady-state condition $\epsilon$ approaches zero volts and therefore this equation may be written as

(18) $\quad kEZ_p^2 \sin^2 \theta = kY_p^2 E[1-\sin^2 \mu - \sin^2 \theta]$

Equation 18 is identical to Equation 14, and the apparatus yields $Y_p^2$ in terms of the shaft position of servo 36. Consequently, this servo drives the movable tap 37 of a second square root potentiometer 38, one side of which is grounded and the other side of which may be connected by switch 40 to a positive or negative reference voltage, again depending upon which of the hydrophones, 1 or 2, first detects a particular acoustic pulse radiated from pinger 4. In this respect, if the received signal is first detected by hydrophone 1, the angle $\mu$ is positive and so is $Y_p$; if the signal is first received by hydrophone 2, the angle is negative and so is $Y_p$.

In the embodiment described hereinbefore, the acoustic pinger was mounted on the ocean bottom at the reference site. However, it should be appreciated that this device can be located at any desired depth above the ocean bottom in order to improve acoustic transmission conditions. All that is necessary is that the depth of this device be known and taken into account in the settings of the two linear potentiometers 17 and 18.

It would be pointed out that although the three hydrophones of the receiving array are shown located at the apices of a right isosceles triangle, different configurations may be employed. Thus, for example, the first and third hydrophone may be unequally spaced from the second hydrophone. If such an array is employed, this unequal dimensional relationship should be taken into account in the solution of the mathematics presented hereinbefore.

Obviously many modifications and variations of the present invention are possible in the light of the above teachings. It is therefore to be understood that within the scope of the appended claims the invention may be practiced otherwise than as specifically described.

What is claimed is:
1. In a system for indicating the plane coordinate position of a vessel with respect to a predetermined nautical site, the combination of
   sound-generating means at said site for periodically transmitting acoustic pulses;
   a sound-receiving array mounted on said vessel and adapted to detect said transmitted acoustic pulses,
      said array comprising three hydrophones positioned in a common plane with the first hydrophone of said array located at the apex of an acute angle of a right isosceles triangle, the second hydrophone of said array located at the apex of the right angle of said right isosceles triangle, and the third hydrophone located at the apex of the other acute angle of said right isosceles triangle, the location of said second hydrophone corresponding to the origin of an orthogonal coordinate system in which said first and third hydrophones occupy positions along the X and Y axes of said system;
   and means responsive to the detection of an acoustic pulse by said first and second hydrophones for developing a first output signal whose amplitude is indicative of the Y coordinate of said vessel with respect to said site and to the detection of the same pulse by said second and third hydrophones for developing a second output signal whose amplitude is indicative of the X coordinate of said vessel with respect to said site.

2. In an arrangement as defined in claim 1 wherein said last-mentioned means includes
   means for generating a first and second signal whose amplitudes are proportional to the time difference in arrival of an acoustic pulse at said first and second hydrophones and said second and third hydrophones, respectively.

3. In an arrangement as defined in claim 1 wherein said last-mentioned means comprises
   means for generating a first and second signal whose amplitudes are proportional to the time difference in arrival of an acoustic pulse at said first and second hydrophones and said second and third hydrophones, respectively;
   means for squaring said first and second signals;
   means for generating a reference signal of a predetermined magnitude;
   an adding circuit;
   means for feeding said squared first signal, said squared second signal and said reference signal to said adding circuit thereby to produce a summation signal;
   a first, second, third and fourth linear potentiometer, each of said potentiometers having one end thereof grounded;
   means for coupling said first signal to the ungrounded other end of said first potentiometer and said second signal to the ungrounded other end of said fourth potentiometer,
      said first and fourth potentiometers having their movable taps set in accordance with the depth of said sound-generating means;
   means for interconnecting the ungrounded other ends of said second and third potentiometers;
   means for coupling said summation signal to the juncture of said second and third potentiometers;
   first and second differential amplifiers,
      each of said amplifiers having a pair of input circuits and an output circuit;
   means for coupling one input circuit of said first differential amplifier to the movable tap of said second linear potentiometer and one input circuit of said second differential amplifier to the movable tap of said third linear potentiometer;

first and second squaring circuits;

means for connecting the input of said first squaring circuit to the movable tap of said first linear potentiometer and the input of said second squaring circuit to the movable tap of said fourth linear potentiometer;

means for connecting the output of said first squaring circuit to the other input of said first differential amplifier and the output of said second squaring circuit to the other input of said second differential amplifier;

first and second servos, said first servo being adapted to be energized by the output of said first differential amplifier and said second servo being adapted to be energized by the output of said second differential amplifier, said first and second servos controlling the position of the movable taps of said second and third linear potentiometers, respectively, whereby the settings of these movable taps change until zero output appears in the output circuits of the differential amplifiers;

fifth and sixth potentiometers, one end of said fifth and sixth potentiometers being grounded;

means for interconnecting the movable tap of said fifth potentiometers to said first servo and the movable tap of said sixth potentiometer to said second servo;

means for connecting the ungrounded other ends of said fifth and sixth potentiometers to a reference voltage of fixed amplitude and of either a positive or negative sign;

and means for extracting an output coordinate signal from the movable taps of said fifth and sixth potentiometers.

References Cited
UNITED STATES PATENTS 3,116,471   12/1963   Coop _____ 340—6 X

OTHER REFERENCES

Ragland: Ocean Sci. and Ocean Eng., Mar. Tech. Soc., vol. 2, 1965, pp. 1145–1157.

RICHARD A. FARLEY, *Primary Examiner.*